June 4, 1946. T. C. SMITH ET AL 2,401,518
POWER DRIVEN WIRE REEL MECHANISM
Filed April 20, 1944    4 Sheets-Sheet 1
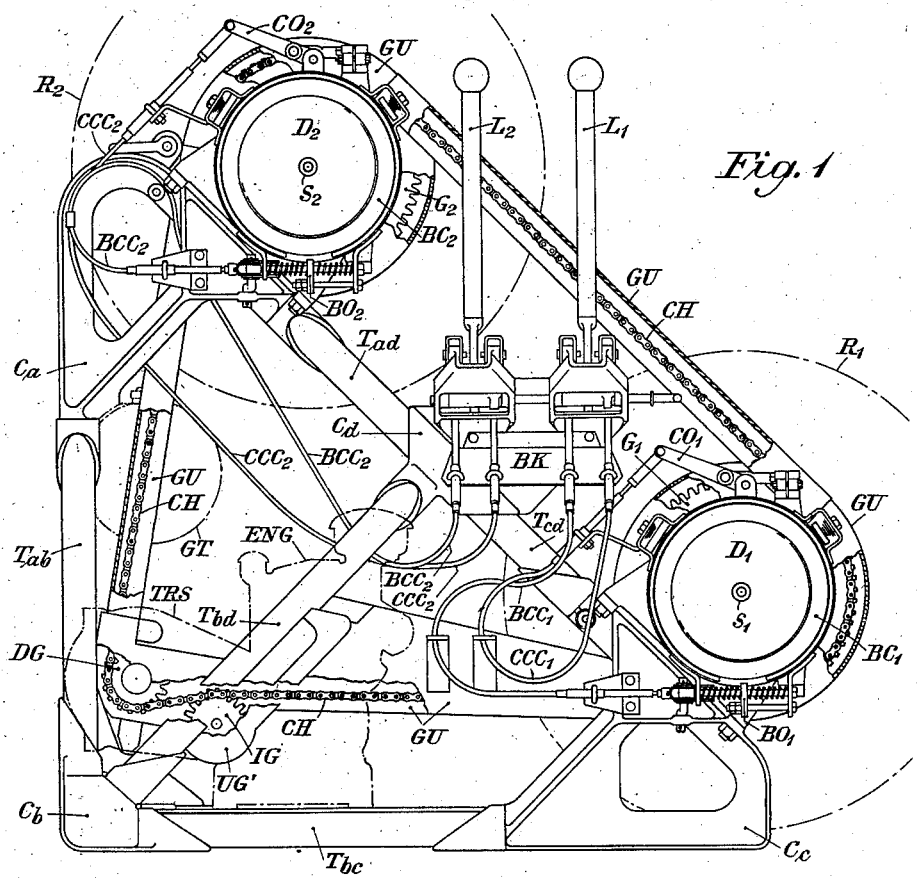
Fig. 1
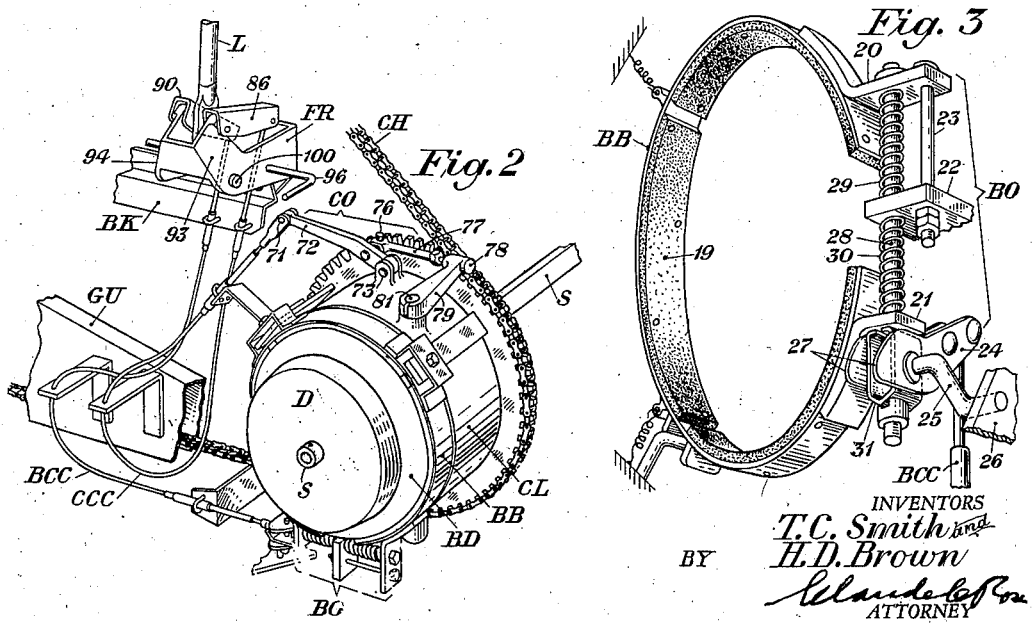
Fig. 2
Fig. 3
INVENTORS
T. C. Smith and
H. D. Brown
BY
ATTORNEY

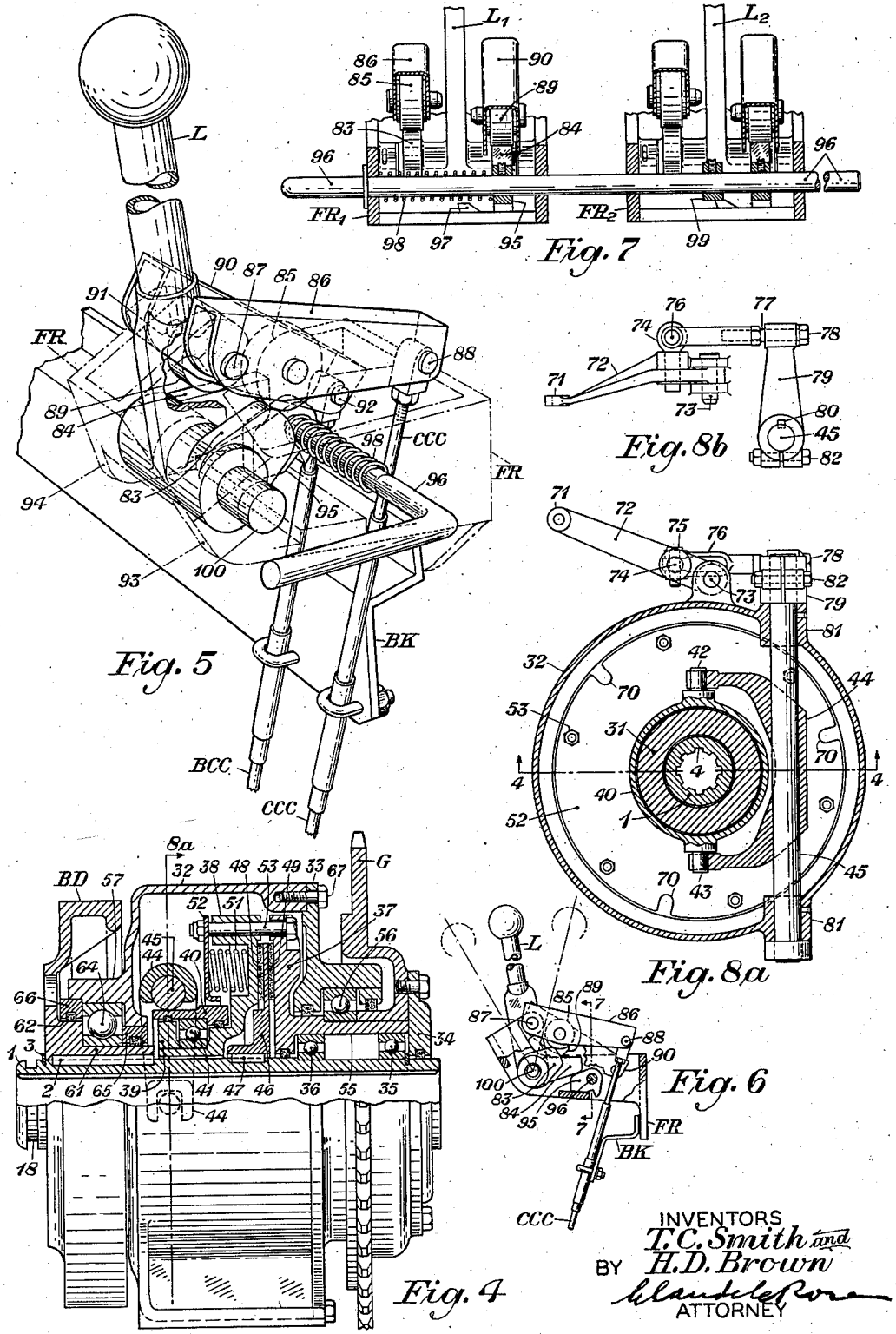

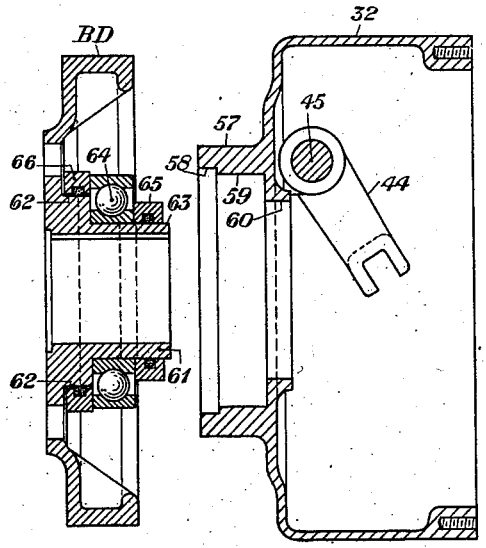
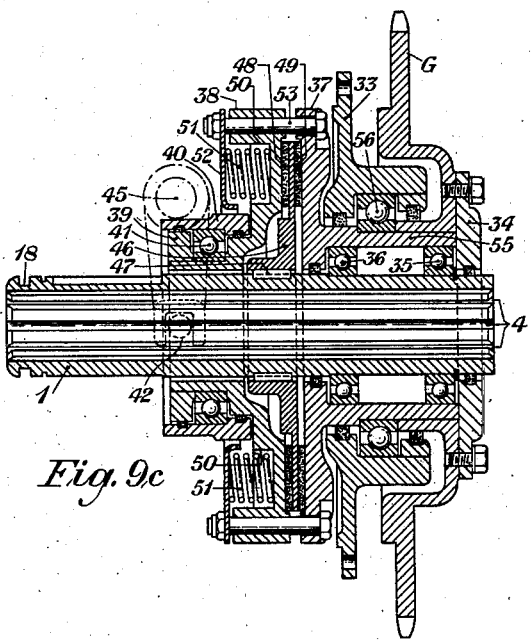
Fig. 9a  Fig. 9b  Fig. 9c
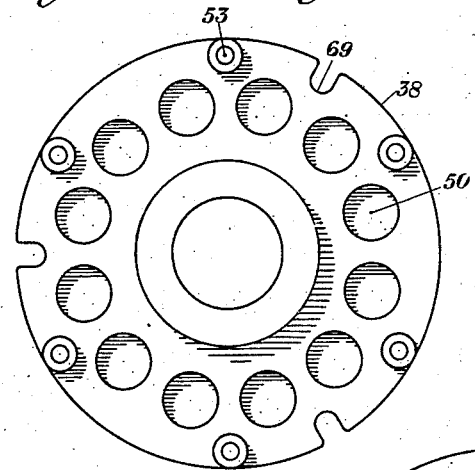
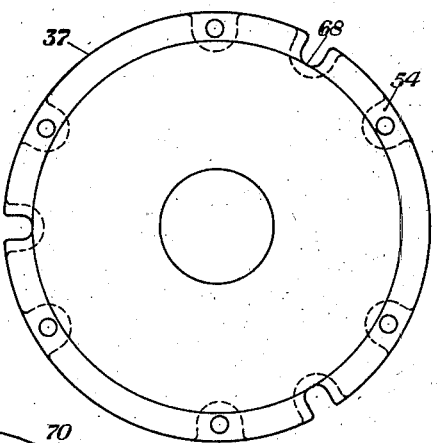
Fig. 10a  Fig. 10b
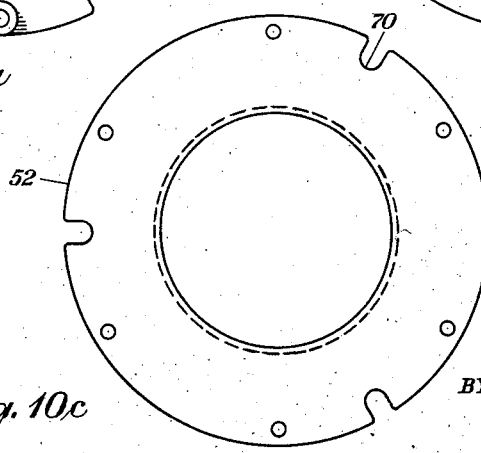
Fig. 10c

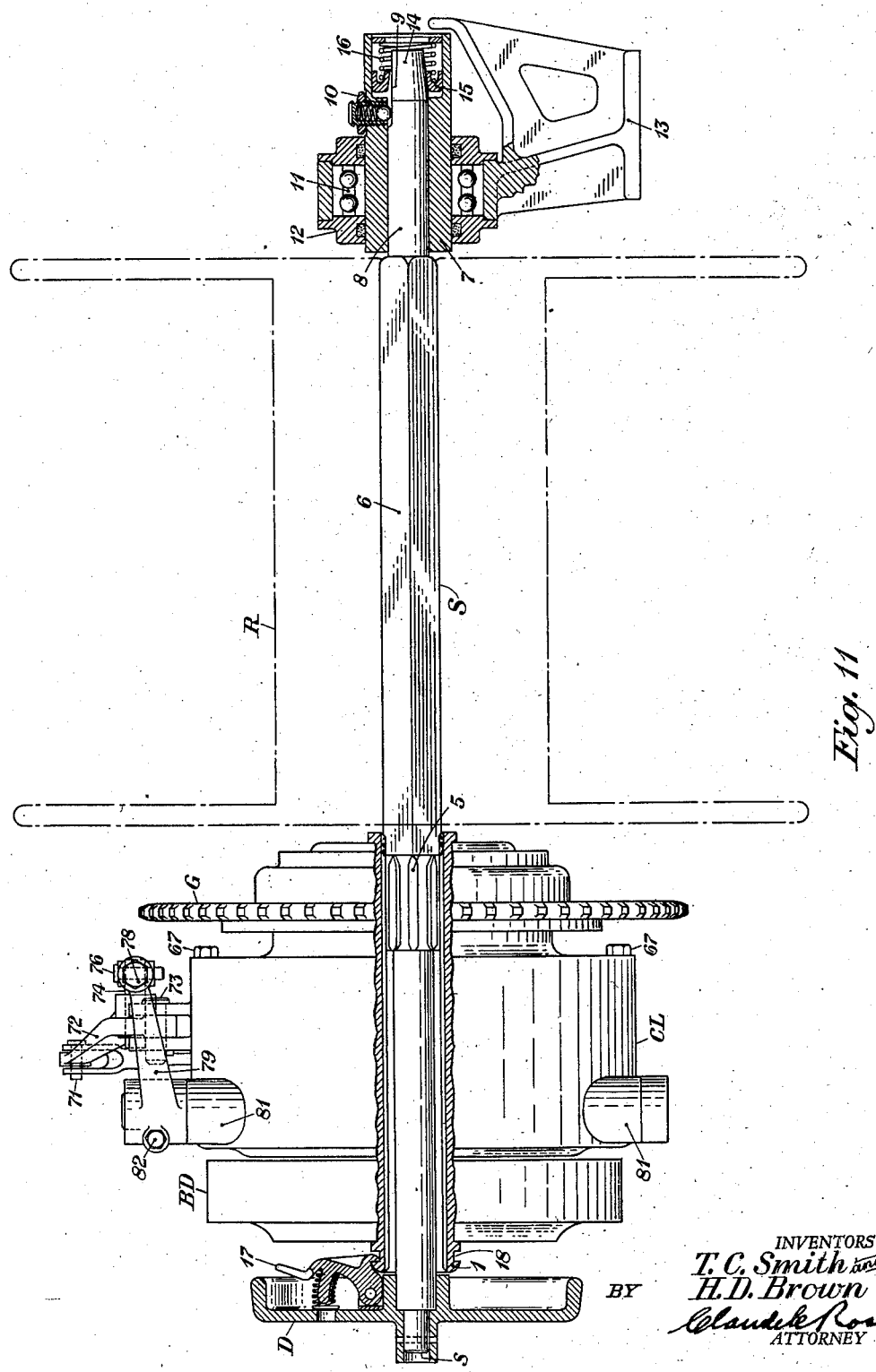

Patented June 4, 1946

2,401,518

UNITED STATES PATENT OFFICE 2,401,518

POWER-DRIVEN WIRE REEL MECHANISM

Temple C. Smith and Howard D. Brown, Westfield, N. J., assignors to American Telephone and Telegraph Company, a corporation of New York Application April 20, 1944, Serial No. 531,916

11 Claims. (Cl. 242—54)

This invention relates to power driven wire reel mechanisms, and more particularly to mechanisms of this type designed to reel and unreel one or more reels of wire as the reeling mechanism is drawn along the ground by tractors or other hauling devices.

One of the objects of the invention is to provide a reel mechanism in which one or more reels are mounted on a suitable framework and arranged to be operated by a power supply, and each is separately controlled through suitable clutch and brake facilities, all mounted upon the framework. Preferably, the framework will be mounted on wheels so that the whole may be drawn along the ground during its reeling and unreeling operations.

Another object of the invention is to provide a mechanism of the type above described, in which brake and clutch mechanisms are mounted as a unitary structure upon the shaft carrying the reel.

Another object of the invention is to provide a clutch designed so that only a single clutch disk of light weight and the brake drum revolve with the shaft carrying the reel when paying out wire, thereby eliminating the flywheel action of heavy clutch parts during this operation. Preferably, the rotating parts are so light that wire may be unwound from the reel without danger of undue wear, heating or the need of frequent lubrication, when the reel mechanism is transported over the ground at a speed as high as 50 miles per hour. This compares with maximum speed of only about 15 miles per hour when taking up wire which has been previously unreeled.

A further object of the invention is to provide a clutch mechanism of such design that the main throw-out bearing of the clutch is not running when paying out wire, thereby reducing wear, heating and oiling troubles.

Still another object of the invention is to provide a clutch mechanism so designed that when the reel shaft is withdrawn, the brake-clutch assembly may be readily removed from the frame, whereupon, by removing the clutch cover from the clutch casing, the entire interior clutch mechanism comes with it and all parts of the clutch are exposed, ready for disassembly and repair.

Still another object of the invention is to provide a clutch mechanism in which the clutch disk (which rotates the reel shaft) and the associated clutch linings, are normally pressed into operating engagement between the clutch pressure plate and the driving plate by means of heavy springs interposed between the pressure plate and a plate for covering the springs. The whole assembly is preferably bolted together in such manner as to permit sufficient movement of the pressure plate, against the pressure of the springs between it and the spring cover plate, to disengage the clutch.

Another object of the invention is to so design the clutch mechanism that when it is necessary to remove the bolts holding the foregoing parts together, the nuts may be backed off without danger of the tremendous pressure of the springs causing the released elements to fly apart suddenly and tear the threads when the nuts near the end of their travel. This is preferably accomplished by providing slots in the peripheries of the several clutch elements, in which longer bolts with somewhat longer threaded parts may be inserted to temporarily hold the parts of the clutch together while the nuts of the main bolts are being withdrawn. Thereafter the nuts on the longer temporary bolts may be gradually backed off until the entire pressure of the springs has been released, after which the nuts may be completely withdrawn without danger.

Another object of the invention is to provide means whereby a single lever controls the operation of the clutch and its associated brake through remote control cables.

A further object of the invention is to provide an operating lever and controlling mechanism so designed that it is impossible to engage both the clutch and the brake simultaneously. To this end the controlling mechanism is so arranged that when the control lever is in neutral position neither the clutch nor brake is engaged. By throwing the lever in one direction, however, the brake is operated, and by throwing it in the opposite direction the clutch is engaged, but the clutch and brake cannot be simultaneously engaged.

A further object of the invention is to provide a single lever control mechanism for the clutch and brake, this mechanism being so designed that when the clutch is disengaged, it will be maintained disengaged through the entire braking range of the control lever, without requiring the application of any force to the control lever for holding the clutch so disengaged.

Still a further object of the invention is to provide the foregoing lever-controlled mechanism for the brake and clutch with locking means whereby when the control lever is moved to disengage position, the clutch operating mechanism may be locked to thereafter prevent accidental engagement of the clutch. This enables paying out the wire from the reel at very high speed with the clutch positively disengaged, so there is no possibility of damage from rotating the engine and other parts backward at high speed, or of breaking the wire, as might occur if the clutch should be accidently engaged during the paying out operation.

These and further objects of the invention may be accomplished by the arrangements hereinafter described and illustrated in the accompanying drawings. In the accompanying drawings, Figure 1 is a side view of the multiple reel mechanism mounted upon a suitable frame, with control levers for the brakes and clutches and with the motor and transmission gearing for driving the reel mounted upon the same frame. Fig. 2 is a perspective view showing the brake-clutch unit mounted upon the reel shaft, with an operating lever and suitable remote control cables for controlling the operating mechanism of the clutch and brake. Fig. 3 is a perspective showing certain details of the brake operating mechanism. Fig. 4 is a sectional view showing the clutch and brake mechanisms assembled and mounted upon the reel driving shaft. Fig. 5 is a perspective showing the control lever and its associated cam mechanism for operating the remote control cables which actuate the clutch and brake. Fig. 6 is an end view of a part of the clutch and brake cam operating arrangements shown in Fig. 5. Fig. 7 is a sectional view of the cam arrangements for operating two separate sets of brakes and clutches by means of separate operating levers, this view particularly showing the locking arrangement whereby the clutches may be locked in disengaged position. Figures 8a and 8b are, respectively, a sectional view and a plan view showing the clutch operating mechanisms. Figures 9a, 9b and 9c show, respectively, the brake drum, the clutch case and the clutch mechanism in disassembled relationship. Figures 10a, 10b and 10c are views showing, respectively, the pressure plate, the driving plate and the spring cover plate of the clutch mechanism. Fig. 11 is a view showing the clutch and brake assembly mounted upon the reel shaft, together with a mechanism whereby the reel shaft may be released and withdrawn from the reel and the clutch-brake assembly when it is desired to disassemble the clutch.

*General description of frame and other parts making up the wire reel mechanism*

Referring to the drawings, Fig. 1 shows an assembly involving two reels with their associated braking and clutch mechanisms, together with a motor and transmission mechanism for driving the reels. In this figure a triangular shaped side framework is shown. This is made up of four castings, $C_a$, $C_b$, $C_c$ and $C_d$, into which are inserted and welded connecting tubes of the framework such as $T_{ab}$, $T_{bc}$, $T_{cd}$, $T_{ad}$, and a cross bracing $T_{bd}$. It will be understood that one of these frameworks is provided on each side of the assembly, and the two frames are held together by suitable cross-members which are not shown. A brake-clutch assembly $BC_1$ is mounted upon the casting $C_c$, and a similar brake-clutch assembly $BC_2$ is mounted on the casting $C_a$. Through these brake-clutch assemblies, shafts $S_1$ and $S_2$ extend to suitable supports on the framework opposite and to the rear of the framework shown in Fig. 1. This opposite framework is, of course, not shown. The general nature of the shaft end supports upon the opposite frame-work may be ascertained by inspection of the arrangement shown at the left of Fig. 11. A driving motor ENG is mounted between the two side frames, this being shown in phantom at ENG. Associated with the motor is a suitable transmission TRS, also shown in phantom, for reducing down or otherwise changing the speed applied to the driving mechanism described hereinafter. A gas tank GT is shown in phantom and mounted between the two side frames. This, of course, supplies the fuel for the motor ENG.

On the end of a shaft extending from the transmission TRS a driving gear DG is shown. This driving gear is coupled by means of a driving chain CH with gears $G_1$ and $G_2$, respectively, arranged to rotate concentrically with respect to the shafts $S_1$ and $S_2$. An idler gear IG is mounted on the frame to maintain the driving chain CH at a suitable degree of tautness. The driving chain CH and the gears $G_1$ and $G_2$ and DG are preferably enclosed by a suitable guard structure shown at GU. Also, the idler gear IG may be enclosed within a suitable guard structure UG', if desired.

The operation of the brake-clutch assembly $BC_1$ is controlled by a lever $L_1$, and similarly, the operation of the brake-clutch $BC_2$ is controlled by a lever $L_2$. These levers are mounted upon a bracket BK, which in turn is mounted on the casting $C_d$ of the side frame. The lever $L_1$, through a cam arrangement to be later described, may actuate either of two remote control cables $BCC_1$ and $CCC_1$ for operating the brake control mechanism $BO_1$ or the clutch operating mechanism $CO_1$ of the brake-clutch assembly $BC_1$. The details of these arrangements will be described later in connection with other figures. Similarly, the lever $L_2$, through a suitable cam arrangement to be described later, controls the clutch operating mechanism $CO_2$ and the brake operating mechanism $BO_2$ of the brake-clutch assembly $BC_2$ through remote control cables $CCC_2$ and $BCC_2$, respectively. These cables are of a known type in which wires of suitable diameter pass through more or less flexible hollow tubing mounted upon the framework. The wires are connected at one end to the lever-controlled mechanism and at the other end to the controlling mechanism for the brake or clutch, as the case may be.

The various figures of the drawings other than Fig. 1 show details of the various parts of the brake-clutch assembly and operating mechanisms for the two reels shown in Fig. 1. As these various mechanisms are the same for each reel in the other figures of the drawings, the parts designated by reference letters are shown without subscripts. It will be understood, of course, that if desired the framework of Fig. 1 might be so designed as to carry additional reels and controlling mechanisms.

*Brake mechanism and reel shaft mounting*

The brake mechanism is of a common type and is illustrated particularly in Figs. 2 and 3. The principal parts are a brake drum BD and a brake band BB. The brake drum BD is shown in cross-section in Figs. 4 and 9a, and is mounted on a hollow shaft 1. It is held in place by a key 2 and a snap ring 3 of well known type which fits into a circumferential groove in the hollow shaft 1, as shown particularly in Fig. 4. In this manner the brake drum BD is affixed to and rotates with the hollow shaft 1. The reel shaft S (see Figs. 2 and 11) has a suitable flanged disk D forming a hand-hold by which the shaft S may be inserted or withdrawn from the hollow shaft 1. When the shaft S is in place it is forced to rotate with the hollow shaft by means of a set of internal splines 4 cut in the inner surface of the hollow shaft and a set of external splines 5 on the shaft S, as shown particularly in Figs. 4, 8a, 9c and 11. As seen in Fig. 11, the shaft S has a squared part 6 which passes through a squared opening in the reel R. In consequence, when the hollow shaft 1 is rotated under power, as will be described later, the brake drum BD, the shaft S and the reel R, rotate together.

As shown in Fig. 11, the end of the shaft S opposite the hand-hold disk D is round in cross-section as appears at 8 and protrudes through a collar 7. The shaft has a flattened part 9 which cooperates with a spring-pressed ball 10 mounted in the collar 7. Hence the collar is forced to rotate with the shaft on a ball bearing 11 within a bearing housing 12 carried by a bracket 13 mounted upon a frame similar to that shown in Fig. 1 and opposite thereto on the other side of the reel.

The extreme end of the rounded part 8 of the shaft S is slightly tapered, as indicated at 14, so that when the shaft S is inserted in the collar 7, the tapered portion 14 engages with a surrounding tapered collar 15, and said collar is forced slightly to the right against the pressure of the spring 16. The shaft forces the collar 15 to the right under manipulation of the manually grasped disk D, and the spring operated latch 17 engages in a circumferential groove 18 on the hollow shaft 1 and thereby locks the shaft S in place.

The brake band BB and its associated parts are shown in perspective detail in Fig. 3. The usual inner linings for the brake band 19 are provided, and on its outer surface are mounted two brackets 20 and 21. Intermediate between these two brackets is a projecting member 22, which may be either integral with or attached to the external casing 32 of the clutch CL which is bolted to the casting Cc of the frame. However, if desired, the member 22 may be attached to or integral with said casting Cc. A bolt 23 extends through suitable holes in the bracket 20 and the member 22 to limit the amount of separation between said members. When the brake operating mechanism is actuated as described later, the bracket 20 is pulled towards the member 22, and its projecting end slides along the bolt 23.

As shown in Fig. 3, the cam lever 24 is pivotally mounted upon a suitable spindle 25 whose opposite end is rotatably secured to a part 26 attached to or forming a part of the casting Cc or Ca, as shown in Fig. 1. The cam lever 24 has cam-shaped ends 27 which cooperate with the outward or projecting portion of the bracket 21, as will be described later. A bolt 28 extends through holes in the brackets 20 and 21 and also through a hole in the member 22. This bolt is surrounded by a coiled spring 29 extending between the bracket 20 and the member 22, and by a similar coiled spring 30 extending between the bracket 21 and the member 22.

These springs serve to normally press the two ends of the brake band apart so that the brake band is free upon the brake drum BD. When, however, the cam lever 24 is pulled by means of the remote control cable BCC under the action of the control lever L as described later, the cam surfaces 27 (which lie on either side of a member 31 through which said bolt 28 extends) tend to drive the bracket arm 21 towards the member 22 and to drive the member 31 away from the bracket 21, thereby pulling the bracket 20 towards the member 22. In this manner the brake band BB is pulled more or less taut upon the brake drum BD, depending upon the degree of pull exercised by the remote control cable BCC. A braking action of any desired degree may be thus effected.

The clutch mechanism

The clutch mechanism and its various parts are best shown in Fig. 4 and Figs. 8a to 10c, inclusive. As shown particularly in Fig. 4, the main clutch casing 32, which encloses the operating parts of the clutch, has attached thereto by means of bolts a clutch cover 33, upon which the various elements of the clutch mechanism are carried. The clutch driving gear G (which is driven by the chain CH of Fig. 1) together with its cover plate 34, are mounted to rotate upon the hollow shaft 1 by means of ball bearings 35 and 36. Attached to the gear G and rotating therewith is the driving plate 37 of the clutch. This member also rotates with respect to the hollow shaft 1 by means of the bearings 35 and 36. The pressure plate 38 of the clutch (see Figs. 4, 9c and 10a) lies opposite the driving plate 37 and is free to rotate with respect to the hollow driving shaft 1.

The pressure plate 38 has a projecting hub-like member 39 which is mounted to rotate within a collar 40 by means of a ball bearing 41. The collar 40, as shown in Fig. 8a, has two spindles 42 and 43 which extend into the forked rocker arms of the clutch yoke 44, which is secured to a rocking shaft 45 extending through bosses 81 on the main clutch casing 32. When this shaft 45 is rocked, as will be described later, the rocker arms shift the ring 40 back and forth to release or engage the clutch. In this action the hub-like member 39 and the associated pressure plate 38 move back and forth with the ring 40.

A relatively light clutch disk 46 is secured to the hollow shaft 1 by means of a key 47. This clutch disk is interposed between the pressure plate 38 and the driving plate 37 of the clutch, with a pair of disk linings 48 and 49 interposed between these members. The pressure plate 38 is provided with a series of twelve recesses or sockets 50 within which twelve coiled springs such as 51 may be mounted, with their opposite ends projecting against the spring cover plate 52. The operating parts 37, 38 and 46 of the clutch are held together by the pressure of these springs reacting against six bolts 53, whose heads are mounted in countersunken portions 54 (see Figs. 9c and 10b) in the back of the driving plate 37, the nuts of the bolt being drawn up against the spring cover-plate 52.

Thus it will be seen that the pressure plate is normally held by the springs 51 in engaged position with respect to the clutch disk 46, the driving plate 37 and the associated disk linings. Therefore, the driving gear G (see Fig. 4), the clutch disk 46 and the pressure plate 38 are all held together with the disk linings under heavy spring pressure so that all of these parts rotate as a unit, and consequently the hollow shaft 1 rotates with the driving gear G. The collar-like portion 55, which connects the gear G to the driving plate 37, rotates with respect to the cover plate 33, of the main housing of the clutch by means of a main bearing 56.

When, however, the pressure plate 38 is moved to the left in Fig. 4 by the action of the clutch yoke 44 upon the ring 40, the elements of the clutch are disengaged from each other so that the shaft 1 and clutch plate 46 of relatively light weight can rotate freely at very high speed when paying out wire, without any excessive flywheel effect. Under this condition the gear G, driving plate 37, pressure plate 38, and the spring plate 52, can rotate idly about the shaft 1. Also the throw-out bearing 41 ceases to rotate and thereby wear, heat, and lubrication troubles are reduced.

The main casing 32 of the clutch is provided with a collar-like extension 57. The inner part of this hub-like extension is bored to three different diameters 58, 59 and 60, as will be particularly clear by reference to Fig. 9b. Also, as will be seen from Fig. 9a, the brake drum BD has a central hub 61 projecting inwardly from its outer wall. The outer surface of this hub is of larger diameter near the outer wall of the brake drum as shown at 62, and the main portion of the hub is of smaller diameter as appears at 63 in Fig. 9a.

Referring now to Fig. 4, it will be seen that a ball bearing 64 is interposed between the inner surface 59 of the hub 57 of the clutch casing, and the outer surface 63 of the hub 61 of the brake drum. An oil retaining member 65 lies on one side of the bearing 64 between the surface 60 of the clutch casing and the surface 63 of the brake drum hub 61. Likewise, a similar oil retainer 66 is interposed between the surface 58 of the hub 57 of the clutch casing, and the outer surface 62 of the brake drum hub 61. This assembly permits the brake drum BD (which is keyed to shaft 1) to rotate with respect to the hub 57 of the clutch casing by means of the bearing 64.

Disassembling clutch

The clutch and brake assembly as above described permits readily removing the clutch and disassembling it. To do this, the workman first takes hold of the disk D, which is pinned to the shaft S (see Fig. 11). By releasing the lever 17 he can then pull the entire shaft S from the end bearing assembly shown at 13 in Fig. 11, from the reel R, and from the inner bore of the shaft 1. In doing this, the outer splines 5 of the shaft S are withdrawn from the inner splines 4 of the shaft 1. The clutch casing 32 may now be unbolted from the side frame to which it is attached as shown in Fig. 1. Also the workman may remove the chain guard, remove the chain from the sprocket, and disconnect the control cables. Then the clutch and brake drum combination may be lifted out and placed at some convenient spot for disassembly.

The workman, in proceeding to disassemble the clutch, first prys the snap ring 3 from the circumferential groove in the shaft 1. The studs 67, which hold the cover plate 33 to the outer casing 32 of the clutch, are then removed. In this condition, the brake drum and the clutch casing 32 may be pulled off of the shaft 1, the key slot in the inner bore of the brake drum sliding over the key 2 of the shaft 1 so that the brake drum and the outer clutch casing come off together. In this operation, the clutch yoke 44 rocks to the right with its shaft 45, as shown in Fig. 9b, and thereby is released from the trunnion pins 42 upon the shift ring 40. Thus, the entire clutch mechanism is exposed as shown in Fig. 9c. Of course, if desired, the brake drum BD and its associated bearings may be removed from the clutch casing 32, as shown in Figs. 9a and 9b.

To disassemble the clutch mechanism itself, advantage is taken of U-shaped slots 68, 69 and 70 cut in the edges of the driving plate 37, the pressure plate 38, and the spring plate 52, respectively. As shown in Figs. 10a, 10b and 10c, there are three of these slots in each of these elements, and when the clutch is assembled the slots in each of the three elements are in alignment. The workman drops into each of these slots a bolt similar to the bolt 53, except that it is somewhat longer and has a longer thread. The nuts on these bolts are then drawn up to the point where they hold the parts 37, 38 and 52 together, and compress the springs 51. The nuts on the bolts 53 are now removed without any possibility of the spring plate 52 following them as they are unscrewed. When the nuts have been removed, the workman can gradually unscrew the nuts from the long bolts in the slots 68, 69 and 70, and gadually slacken the tension on the springs 51 until the springs no longer apply any pressure to the nuts. When this condition is reached, the nuts can be completely removed without any danger whatever, and the several operating parts of the clutch may be pulled apart.

Clutch operating mechanism

The clutch operating mechanism, as distinguished from the clutch mechanism itself, is best shown in Figs. 2, 5, 8a and 8b. The remote control cable CCC is pivotally connected at 71 to the outer end of an operating lever 72. This lever is pivoted at 73 between two lugs on the outer surface of the clutch casing 32. Between the pivotal points 71 and 73 the lever 72 carries an eyebolt 74 which is rotatable with respect thereto, and has its eye pivoted at 75 between the yoke arms 76 of link 77. The end portion 78 of the link 77 passes through a hole in the outer end of the operating arm 79. This operating arm 79 is keyed at 80 to the clutch operating shaft 45 and is clamped to said shaft by means of the bolt 82.

With this arrangement, when the lever L, as will be described later, is moved in a direction to lift the clutch rocker-arm 86 upwardly, it pulls the operating lever 72 downwardly by means of the distant control cable CCC (see Fig. 2). The link 77 now pulls the operating arm 79 in a counterclockwise direction as one looks down on Fig. 8b. This moves the shaft 45 in Figs. 4 or 9c, which is seen in said figures from an opposite view point, in a clockwise direction. Thus collar 40 is shifted to the left in Fig. 4, and with it the pressure plate 38 of the clutch is moved to the left against the pressure of the springs 51. The clutch is now released and the clutch plate 46 is free to rotate with the shaft 1 independently of the operating gear G. In this condition, the reel mechanism can be moved rapidly to unreel wire along the ground, the only flywheel action being that of the clutch plate 46 and the brake drum BD. The reel assembly may be transported at a speed as high as fifty miles per hour while unreeling wire, without undue wear or heating, and without necessitating frequent lubrication.

When the lever L releases the tension on the remote control cable CCC, the springs 51 of the clutch automatically force the several parts of the clutch into engagement by moving the pressure plate 38 in Fig. 4 to the right. This rocks the operating shaft 45 as seen in Fig. 4 in a counterclockwise direction. Through the operating arm 79 and link 77 (see Figs. 2, 8a and 8b), the control lever 72 is caused to move upwardly in Fig. 2. This can only occur when the lever L is moved to the right in Fig. 6 so as to permit the clutch rocker-arm 86 to be pulled down by the remote control cable CCC under the pressure of the clutch springs 51.

With the clutch thus engaged, the gear G operates upon the shaft 1 through the clutch. Shaft 1 rotates the shaft S to cause the reel R to wind up wire upon the reel. In winding the wire upon the reel in this manner, the reel mechanism, as it approaches the anchored end of the wire, may be propelled by its tractor mechanism at a linear speed determined by the speed of rotation of the shaft S. The maximum speed at which the reel mechanism may be propelled under these conditions is of the order of fifteen miles per hour. When the clutch is engaged operating as above described, the brake is released, as will appear later.

*Operation of the brake and clutch under the control of the operating lever*

The operating lever L and the cams controlled thereby are of such a nature that the clutch cannot be engaged and the brake applied at the same time, although both the brake and the clutch may be in release when the lever L is in its neutral position. The mechanism by which this is accomplished is best shown in Figs. 2, 5, 6 and 7.

The operating lever L controls both the clutch and the brake, and for this purpose it is provided with a clutch-actuating cam 83 and a brake-actuating cam 84, both forming a unitary structure rotatable about an axle 100, as shown particularly in Figs. 5 and 6. The clutch cam 83 cooperates with the roller 85 carried by the clutch rocker arm 86, which is pivoted at 87. At its opposite end it is operatably connected at 88 to one end of the remote control cable CCC, which actuates the clutch mechanism as already described.

Similarly, the brake-actuating cam 84 cooperates with the roller 89 carried by the brake rocker arm 90, which is pivoted at 91 coaxially with the pivot 87 of the clutch rocker arm 86. At its opposite end, the brake rocker arm 90 is operatably connected at 92 (see Fig. 5) to an end of the remote control cable BCC.

The assemblage consisting of the brake and clutch cams and the corresponding brake and clutch rocker arms, as shown in such figures as Fig. 5 and Fig. 6, is mounted on framework FR. The general form of this framework is perhaps better shown in Fig. 2. In general, it is a more or less rectangular framework having vertical sides. The sides taper towards each other, as shown at 93 and 94, to form two upwardly extending portions to which the clutch rocker arm 86 and the brake-rocker arm 90 may be pivoted. These arms are in cross-section shaped like an inverted U, so that they lie over the tops of the upward projecting members of the frame FR, with the lever L₁ lying between them and journaled by means of the axle 100 of the unitary cam arrangement between the side members of the frame FR.

In addition to the brake and clutch operating cams, a locking cam 95 is provided, this cam being attached to the endwise movable locking rod 96 (see Figs. 5, 6 and 7). This cam is so constructed that when the lever L is in its neutral position the cam 95 may be moved under the brake-actuating cam 84. As this cam is unitary with the clutch-actuating cam 83, any attempt to move the operating lever L to clutch-engaging position will be prevented by the brake cam coming in contact with the cam 95.

Referring to Fig. 7, it will be noted that when it is not desired to use the locking cam 95, the rod 96 will be withdrawn to the left until the cam 95 latches behind the latch shoulder 97. The rod 96 may be provided with a collar 99 which engages with the left side wall of the frame FR, to limit the movement of the rod 96.

Attention is also called to the fact that the clutch-actuating cam 83 is so shaped that when the lever L is moved to the left in Figs. 5 and 6 from its clutch-engaging position, the roller 85 of the clutch rocker arm 86 is held in the clutch released position while the lever L is moved further to the left to actuate the brake. This shape of the clutch enables the operator to move the lever to apply the brake or release it, without any force being applied to hold the clutch in its disengaged position. This is because the end of the cam 83 takes up the pull of the clutch-actuating springs 51.

*General operation of the reel mechanism*

Referring particularly to Figs. 5 and 6, if the lever L is in its extreme left or braking position and is pushed to the right into its neutral position, the brake-actuating cam 84 is moved downwardly and permits the brake rocker arm 90 to move downwardly. As will be clear from Figs. 1 and 2, this releases the brake by moving the brake controlling lever 24 (see Fig. 3) into such position that the two brackets carried by the brake band BB can be pushed apart by the springs 28 and 29. If the lever L is moved through neutral to the extreme right the clutch will be engaged because the downward movement of the clutch-actuating cam 83 permits the clutch rocker arm 86 to move downwardly. As will be clear from Fig. 2, the remote control cable CCC is thus moved in a direction to permit the clutch operating lever 72 to be pulled upwardly due to the pressure of the clutch springs 51. As has already been described, such operation of the lever 72 engages the clutch. If, therefore, power is applied with the motor ENG through the driving gear DG to the gears G₁ and G₂ of Fig. 1, said gears G₁ and G₂ will operate through their respective engaged clutches to drive the reels R₁ and R₂ under power, as previously described. This is the operation which is used to pick up wire that has been unreeled.

If, now, the lever L in Figs. 5 and 6 is moved leftwardly to its neutral position, the clutch cam 83 raises its roller, thereby elevating the end of the clutch-rocker arm 86. This moves the remote control cable CCC in such a direction as to pull the clutch operating lever 72 in Fig. 8a downwardly, which releases the clutch in the manner already described. In the neutral position, the roller 85 just passes over one edge of the end portion of the cam 83, so that the end of the cam takes up the pressure of the springs 51 of the clutch during its released condition. In this neutral position, neither the clutch nor the brake is engaged.

Upon pulling the lever L in Figs. 5 and 6 further to the left, the brake cam 84 raises the roller 89, thereby lifting the brake rocker arm 90. This pulls the remote control cable BCC in such a direction as to apply the brake through the brake mechanism shown in Fig. 3, as will be clear from consideration of the connections of the cable BCC in Fig. 2. Thus it will be seen that it is impossible to engage both the clutch and the brake simultaneously. It will also be noted that the control of both the clutch and the brake is determined by a single lever. By having two levers, such as L1 and L2 as shown in Fig. 1, the two clutch-brake combinations associated with the shafts S1 and S2, respectively, may be independently controlled in the manner above described.

It will be also noted that as the lever L is moved back and forth within a range to the left of its neutral position, greater or less pressure may be applied to the brake as desired. Meanwhile, the clutch is maintained released by reason of the roller 85 riding over the end of the clutch-actuating cam 83. Thus the clutch is held disengaged, as already pointed out, without any force being applied to the lever L to hold the pressure plate 38 against the pressure of the clutch springs 51.

In paying out wire, which is usually done at very high speed, it is desirable that the clutch be positively disengaged, as accidental engagement of the clutch during this operation would damage the engine and other mechanisms by reason of being forced to run backwards at high speed, or it might cause breakage of the wire. This dangerous condition may be prevented by moving the handle of the rod 96 of Fig. 7 so that it will rock the rod along its axis. This releases the cam 95 from the shoulder 97. Under pressure of the spring 98, the rod 96 is moved to the left in Fig. 7. As soon as the levers L1 and L2 are pulled far enough to the left to disengage the clutches, the cam 84 and the corresponding cam controlled by the lever L2 are raised high enough so that the locking cam 95 and the corresponding cam associated with lever L2 move under the brake-actuating cams. This locks the clutches in released position in the manner already described. However, it does not affect the braking action, as either lever L1 or L2 may be moved into braking position as previously explained.

To release the clutch cam 95, the rod 96 is pulled to the left in Fig. 7 and rocked slightly so as to lock the cam 95 behind the abutment 97. As already pointed out, the movement of the rod 96 to the left may be limited by a collar 99 affixed to the rod, as shown in Fig. 7. Therefore, the rod can be pulled to the left no farther than the distance required for the collar 99 to engage the side of the frame FR2.

While this invention has been disclosed in certain specific arrangements which are deemed desirable, it will be obvious that the general principles herein set forth may be embodied in many other organizations widely different from those illustrated, as do not depart from the spirit of the invention as defined in the appended claims.

What is claimed is:

1. In a reel mechanism, a frame, a shaft associated with said frame, a unitary brake and clutch mechanism mounted on said shaft, said mechanism including a clutch casing mounted on said frame, a brake drum mounted on said shaft and having a bearing in said casing, a brake band about said drum, said brake band being attached to said frame, a clutch assembly within said casing adapted to be removed therefrom and leaving said brake, brake band and clutch casing still associated with said frame, said clutch assembly including a clutch disk affixed to said shaft, a driving plate and a pressure plate adapted to engage said clutch disk, a spring cover plate, springs compressed between said spring cover plate and said pressure plate to force said disk, driving plate and pressure plate into frictional engagement to operate said shaft, holding bolts extending through the outer peripheral portions of said spring cover plate, said pressure plate and said driving plate, to hold them in assembled relationship against the pressure of said springs, and slots in the outer peripheries of said plates into which somewhat longer bolts with longer threads may be laid and their nuts drawn up to take up the pressure normally applied to the nuts of said holding bolts, whereupon the nuts of said holding bolts may be withdrawn without danger of tearing their threads due to the spring pressure, after which the nuts of said longer bolts may be gradually backed off until the spring pressure is entirely released before the nuts are completely withdrawn.

2. A reel mechanism including a framework, a reel mounted on a main shaft extending across said framework, a hollow shaft surrounding said main shaft and arranged to rotate therewith, a brake and a clutch arranged as a unitary structure and mounted concentrically with respect to said hollow shaft, a housing for said clutch including an outer casing upon which the brake band is supported, a clutch cover normally attached to and closing said housing, said hollow shaft being housed within said casing and rotatably mounted with respect to said cover, and the elements of said clutch when in assembled relation being housed within said casing and rotatably mounted with respect to said cover, whereby when said main shaft is withdrawn and said cover is detached from said casing, the clutch cover together with associated clutch elements and hollow shaft may be removed and exposed for disassembly or repair.

3. A reel mechanism including a framework, a reel mounted on a shaft extending across said framework, means to supply power to drive said shaft, a clutch and a brake combination for controlling said shaft, said clutch having frictional parts and actuating springs arranged so that said parts normally engage under the pressure of actuating springs to apply said power to rotate said shaft, an operating lever having two cams, one to control the clutch and one to control the brake, clutch operating mechanism and brake operating mechanism, said clutch cam having an operating surface and a surface concentric with the cam axis, said operating surface operating when said controlling lever is shifted to neutral position to actuate said clutch operating mechanism to disengage the parts of said clutch against the pressure of said actuating springs, the back pressure of said springs then being exerted against the concentric surface of said cam without any radial component so that the lever can be held in neutral without effort on the part of the operator; and said brake controlling cam operating when said lever is in neutral to cause said brake operating mechanism to maintain said brake released.

4. A reel mechanism including a framework, a reel mounted on a shaft extending across said framework, means to supply power to drive said shaft, a clutch and a brake combination for controlling said shaft, said clutch having frictional parts and actuating springs arranged so that said parts normally engage under the pressure of actuating springs to apply said power to rotate said shaft, an operating lever having two cams, one to control the clutch and one to control the brake, clutch operating mechanism and brake operating mechanism, said clutch cam having an operating surface and a surface concentric with the cam axis, said concentric surface of said clutch cam operating said clutch operating mechanism when said controlling lever is in brake actuating position to hold the parts of said clutch disengaged against the pressure of said actuating springs, the back pressure of said springs being exerted against the concentric surface of said cam without any radial component when said lever is in brake actuating position so that the lever can be held in that position without effort on the part of the operator other than that required to actuate the brake, and said brake controlling cam operating when said lever is in brake actuating position to cause said brake operating mechanism to actuate the brake.

5. A reel mechanism including a framework, a reel mounted on a shaft extending across said framework, means to supply power to drive said shaft, a clutch and a brake combination for controlling said shaft, said clutch having frictional parts and actuating springs arranged so that said parts normally engage under the pressure of actuating springs to apply said power to rotate said shaft, an operating lever having two cams, one to control the clutch and one to control the brake, clutch operating mechanism and brake operating mechanism, said clutch cam having an operating surface and a surface concentric with the cam axis, said concentric surface of said clutch cam operating said clutch operating mechanism when said controlling lever is in neutral position to hold the parts of said clutch disengaged against the pressure of said actuating springs, the back pressure of said springs being exerted against the concentric surface of said cam without any radial component when said lever is in neutral position so that the lever can be held in neutral without effort on the part of the operator, and said brake controlling cam operating when said lever is in neutral to cause said brake operating mechanism to maintain said brake released, said operating surface of said clutch controlling cam operating when said lever is shifted from neutral position to clutch operating position to permit said clutch operating mechanism to operate the parts of said clutch to engaged position under the pressure of said springs to operate said shaft.

6. A reel mechanism including a shaft carrying a reel, a brake and a clutch arranged as a unitary assembly and mounted concentrically with respect to said shaft, said brake including a drum affixed to said shaft, said clutch mechanism including a single disk affixed to said shaft, a disk free of said shaft to which power may be applied, and a spring actuated disk movable axially with respect to said shaft to normally produce pressure engagement between said disks to drive the reel, each of said disks having cooperating flat surfaces in planes at right angles to the axis of said shaft, manually controlled means to move said spring actuated disk against said normal spring pressure so that the reel may pay out wire rapidly without flywheel action other than that due to the brake drum and said first mentioned disk.

7. A reel mechanism including a framework, a reel mounted on a shaft extending across said framework, a brake and a clutch arranged as a unitary assembly and having operating parts mounted concentrically with respect to said shaft, said assembly being detachably affixed to said framework, said reel and the operating parts of said brake and clutch assembly having openings along a common axis, said shaft being extended slidably through said assembly and said reel, means whereby when said shaft is extended through said openings one end of said shaft is rotatably attached to one side of said frame, means to rotatably lock said shaft in position, means to operate selectively either said brake or said clutch, means to drive said shaft when said clutch is operated into engagement, means to release said lock to unlatch said shaft from said frame so that the shaft may be withdrawn from the interior of said brake and clutch assembly and also from said reel, thus permitting said brake and clutch assembly to be detached and removed from said frame for disassembly after said shaft is removed.

8. A reel mechanism including a framework, a reel mounted on a shaft extending across said framework, a brake and a clutch arranged as a unitary assembly and having operating parts mounted concentrically with respect to said shaft, said assembly being detachably affixed to said framework, said reel and the operating parts of said brake and clutch assembly having openings along a common axis, said shaft being extended slidably through said assembly and said reel, means whereby when said shaft is extended through said openings one end of said shaft is rotatably attached to one side of said frame, said means including a spring pressed member engaging the end of said shaft, means to rotatably lock said shaft in position, means to operate selectively either said brake or said clutch, means to drive said shaft when said clutch is operated into engagement, means to release said lock to unlatch said shaft from said frame so that the shaft may be withdrawn from the interior of said brake and clutch assembly and also from said reel to permit removal of the reel from the machine and, if desired, its replacement by a new reel of wire.

9. A reel mechanism including a framework, a reel mounted on a shaft extending across said framework, means to supply power to drive said shaft, a clutch and a brake combination for controlling said shaft, said clutch having frictional parts and actuating springs arranged so that parts normally engage under the pressure of said actuating springs, and a lever for each clutch and brake combination, said lever being movable about an axis from neutral to a plurality of operating positions, clutch operating mechanism and brake operating mechanism, cams movable with said lever about its axis, one for actuating said clutch operating mechanism and one for actuating said brake operating mechanism, said cams being so shaped and so relatively positioned about said axis that when the lever is in neutral position the one cam is positioned to actuate the brake operating mechanism to release the brake and the other cam is positioned to actuate the clutch operating mechanism to disengage the clutch against the pressure of said springs, said cams being also shaped and relatively positioned that when said lever is shifted to one operating position one cam is positioned to actuate the clutch operating mechanism to cause the clutch to engage and the other cam is positioned to actuate the brake operating mechanism to release the brake, and when the lever is shifted to its other operating position said cams are positioned to actuate the respective operating mechanisms to engage the brake and release the clutch against the pressure of said springs.

10. A reel mechanism including a framework, a reel mounted on a shaft extending across said framework, means to supply power to drive said shaft, a clutch and a brake combination for controlling said shaft, said clutch having frictional parts and actuating springs arranged so that said parts normally engage under the pressure of said actuating springs, and a lever for each clutch and brake combination, said lever being movable about said axis from neutral to a plurality of operating positions, clutch operating mechanism and brake operating mechanism, cams movable with said lever about its axis, one for actuating said clutch operating mechanism and one for actuating said brake operating mechanism, said cams being so shaped and so relatively positioned about said axis that when the lever is in neutral position the one cam is positioned to actuate the brake operating mechanism to release the brake and the other cam is positioned to actuate the clutch operating mechanism to disengage the clutch against the pressure of said springs, said cams being also so shaped and relatively positioned that when said lever is shifted to one operating position one cam is positioned to actuate the clutch operating mechanism to cause the clutch to engage and the other cam is positioned to actuate the brake operating mechanism to release the brake, and when the lever is shifted to its other operated position said cams are positioned to actuate the respective operating mechanism to engage the brake and release the clutch against the pressure of said springs, one of said cams also being so shaped and positioned that when said lever is in brake-engaging position the clutch is mechanically held in disengagement by the surface of said cam against the pressure of its actuating springs so that the back pressure of said springs is taken up by the surface of said cam, whereby the lever may be held in said position without effort on the part of the operator.

11. A reel mechanism including a framework, a reel mounted on a shaft extending across said framework, means to supply power to drive said shaft, a clutch and a brake combination for controlling said shaft, said clutch having frictional parts and actuating springs arranged so that said parts normally engage under the pressure of actuating springs, and a lever for each clutch and brake combination, said lever being movable about an axis from neutral to a plurality of operating positions, clutch operating mechanism and brake operating mechanism, cams movable with said lever about its axis, one for actuating said clutch operating mechanism and one for actuating said brake operating mechanism, said cams being so shaped and so relatively positioned about said axis that when the lever is in neutral position the one cam is positioned to actuate the brake operating mechanism to release the brake, and the other cam is positioned to actuate the clutch operating mechanism to disengage the clutch against the pressure of said springs, said cams being also so shaped and relatively positioned that when said lever is shifted to one operating position one cam is positioned to actuate the clutch operating mechanism to engage the clutch, and the other cam actuates the brake operating mechanism to release the brake, and when the lever is shifted to its other operating position said cams are positioned to actuate the respective operating mechanism to engage the brake and release the clutch against the pressure of said springs, and locking means capable of operation when said clutch is disengaged against the pressure of said springs to lock it to prevent its reengagement.

TEMPLE C. SMITH.
HOWARD D. BROWN.